(12) United States Patent
Van Berchum et al.

(10) Patent No.: US 10,213,743 B2
(45) Date of Patent: Feb. 26, 2019

(54) PROCESS FOR PREPARING MEMBRANES

(71) Applicant: Fujifilm Manufacturing Europe B.V., Tilburg (NL)

(72) Inventors: Bastiaan Van Berchum, Tilburg (NL); Johannes Van Engelen, Tilburg (NL); Willem Van Baak, Tilburg (NL); Adam Batting, Broadstairs (GB)

(73) Assignee: Fujifilm Manufacturing Europe B.V. (NL)

( * ) Notice: Subject to any disclaimer, the term of this patent is extended or adjusted under 35 U.S.C. 154(b) by 348 days.

(21) Appl. No.: 15/113,516

(22) PCT Filed: Jan. 23, 2015

(86) PCT No.: PCT/GB2015/050157
§ 371 (c)(1),
(2) Date: Jul. 22, 2016

(87) PCT Pub. No.: WO2015/110828
PCT Pub. Date: Jul. 30, 2015

(65) Prior Publication Data
US 2017/0007965 A1    Jan. 12, 2017

(30) Foreign Application Priority Data
Jan. 27, 2014 (GB) .................................. 1401310.6

(51) Int. Cl.
*B01D 61/46* (2006.01)
*B01D 61/48* (2006.01)
(Continued)

(52) U.S. Cl.
CPC ........... *B01D 61/46* (2013.01); *B01D 61/485* (2013.01); *B01D 67/0006* (2013.01);
(Continued)

(58) Field of Classification Search
CPC ..... B01D 61/46; B01D 61/485; B01D 67/006
See application file for complete search history.

(56) References Cited

U.S. PATENT DOCUMENTS

| 4,705,527 A | 11/1987 | Hussamy |
| 5,091,447 A * | 2/1992 | Lomasney .............. B08B 17/04 428/413 |

(Continued)

FOREIGN PATENT DOCUMENTS

| GB | 2217338 A | 10/1989 |
| WO | 2013/011272 A1 | 1/2013 |
| WO | 2013011273 A1 | 1/2013 |
| WO | 2013014420 A1 | 1/2013 |
| WO | 2013153360 A1 | 10/2013 |

OTHER PUBLICATIONS

International Search Report re Corresponding PCT Applicaiton No. PCT/GB2015/050157 dated Apr. 21, 2015.

*Primary Examiner* — Dah-Wei D. Yuan
*Assistant Examiner* — Kristen A Dagenais-Englehart
(74) *Attorney, Agent, or Firm* — Banner & Witcoff, Ltd.

(57) ABSTRACT

A process for preparing an ion-exchange membrane having a textured surface profile comprising the steps (i) and (ii): (i) applying a radiation-curable composition to a membrane in a patternwise manner; and (ii) irradiating and thereby curing the radiation-curable composition present on the membrane; wherein the radiation-curable composition comprises: a) 10 to 65 wt % of curable ionic compound(s) comprising one ethylenically unsaturated group; b) 3 to 60 wt % of cross-linking agent(s) comprising at least two ethylenically unsaturated groups and having a number average molecular weight below 800; c) 0 to 70 wt % of inert solvent(s); d) 0 to 10 wt % of free-radical initiator(s); and e) 0.5 to 25 wt % of thickening agent(s).

14 Claims, 2 Drawing Sheets

(51) Int. Cl.
- *C08J 5/22* (2006.01)
- *C09D 11/101* (2014.01)
- *B01D 67/00* (2006.01)
- *B01D 69/12* (2006.01)
- *C09D 11/02* (2014.01)
- *B41F 3/00* (2006.01)
- *C09D 4/00* (2006.01)

(52) U.S. Cl.
CPC .............. *B01D 69/125* (2013.01); *B41F 3/00* (2013.01); *C08J 5/22* (2013.01); *C09D 4/00* (2013.01); *C09D 11/02* (2013.01); *C09D 11/101* (2013.01); *B01D 2323/30* (2013.01); *B01D 2323/34* (2013.01); *B01D 2325/08* (2013.01); *B01D 2325/42* (2013.01)

(56) References Cited

U.S. PATENT DOCUMENTS

| | | | |
|---|---|---|---|
| 9,238,221 | B2 | 1/2016 | Van Berchum et al. |
| 2010/0065490 | A1 | 3/2010 | Balster et al. |
| 2011/0097645 | A1 | 4/2011 | Van Baak et al. |
| 2012/0024697 | A1 | 2/2012 | Antheunis et al. |
| 2012/0031834 | A1* | 2/2012 | Higa ............. B01D 61/44 210/500.42 |
| 2014/0305863 | A1* | 10/2014 | Van Engelen ..... B01D 67/0006 210/500.27 |
| 2014/0378561 | A1 | 12/2014 | Van Berchum et al. |
| 2015/0105481 | A1 | 4/2015 | Hessing et al. |
| 2015/0290594 | A1 | 10/2015 | Van Berchum et al. |

\* cited by examiner

PROCESS FOR PREPARING MEMBRANES

RELATED APPLICATIONS

This application is a National Stage Application under 35 U.S.C. 371 of co-pending PCT application PCT/GB2015/050157 designating the United States and filed Jan. 23, 2015; which claims the benefit of GB application number 1401310.6 and filed Jan. 27, 2014 each of which are hereby incorporated by reference in their entireties.

This invention relates to membranes, to a process for their preparation and to the use of such membranes, e.g. in electrodialysis or reverse electrodialysis, and to radiation-curable compositions.

In reverse electrodialysis ("RED"), electricity may be generated in an environmentally friendly manner from the mixing of two ionic solutions having different ionic concentrations, e.g. from mixing salty sea water and fresh or brackish water. This technique uses an RED unit comprising a membrane stack having alternating cation and anion exchange membranes and an electrode at each end of the stack. Each cation and anion exchange membrane, together with the space between these membranes, is often called a "cell" and membrane stacks usually comprise many cells. Typically there is a first pathway through the reverse electrodialysis unit for a concentrated ionic solution, and a second pathway through the reverse electrodialysis unit for a dilute ionic solution. When the concentrated ionic solution is introduced into the first pathway, and the dilute ionic solution is introduced into the second pathway, solute from the concentrated solution in the first pathway passes through the membranes to the dilute solution in the second pathway, this being accompanied by the generation of an output electricity across the electrodes at the ends of the stack. In existing stacks the flow direction through the stacks is usually co-current or counter-current.

The voltage generated by the concentration difference across each pair of membranes is low, but this voltage is multiplied by increasing the number of alternating cation and anion exchange membranes that separate the two solutions in the membrane stack.

Electrodialysis ("ED") uses similar membrane stacks to those used in RED but in this case electricity is applied across electrodes at each end of the stack in order to remove unwanted ions from one of the ionic solutions. ED may be used, for example, to prepare potable water from salty sea water.

The abovementioned RED and ED techniques both require membrane stacks comprising numerous anion and cation exchange membranes arranged in an alternate manner. Thus an industry has built up which provides anion and cation exchange membranes.

The problems with existing membrane stacks include the cost of their manufacture and the cost of ongoing maintenance. The membranes in the stack can become fouled over time, resulting in down-time for cleaning. Embossing is a possible technique to texture membranes but only when the membranes are thick and rigid.

Although textured membranes have been described in earlier publications, they are not generally available from commercial sources, possibly because of the difficulty in producing textured membranes. There is a need for a fast and efficient process for manufacturing ionically charged membranes having a textured surface profile.

According to a first aspect of the present invention there is provided a process for preparing an ion-exchange membrane having a textured surface profile comprising the steps (i) and (ii):
(i) applying a radiation-curable composition to a membrane in a patternwise manner; and
(ii) irradiating and thereby curing the radiation-curable composition present on the membrane;
wherein the radiation-curable composition comprises:
a) 10 to 65 wt % of curable ionic compound(s) comprising one ethylenically unsaturated group;
b) 3 to 60 wt % of crosslinking agent(s) comprising at least two ethylenically unsaturated groups and having a number average molecular weight ("NAMW") below 800;
c) 0 to 70 wt % of inert solvent(s);
d) 0 to 10 wt % of free-radical initiator(s); and
e) 0.5 to 25 wt % of a thickening agent(s).

Preferably the radiation-curable composition is free from catalysts, e.g. free from noble metal particles (e.g. particles comprising platinum, palladium, osmium, iridium, rhodium and/or ruthenium particles and alloys comprising any of the foregoing.

Figure 1:
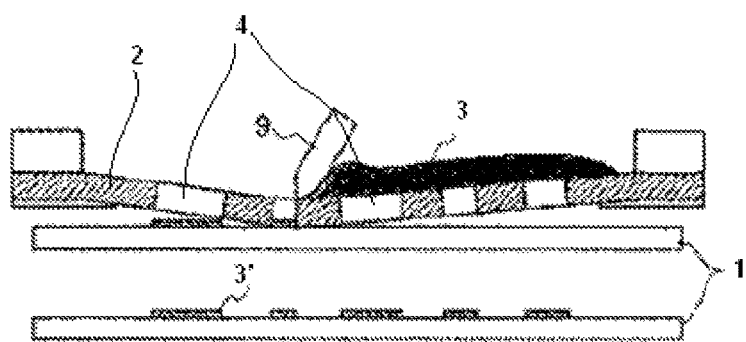
FIG. 1 is a schematic representation of step (i) of the present process.

In the top half of FIG. 1, a radiation-curable composition (3) is being forced against a screen (2) using a squeegee (9). A part of the composition (3) passes through holes (4) in screen (2) and onto membrane (1). In the bottom half of FIG. 1, one can see the membrane (1) carrying the part of the radiation-curable composition (3) which has passed through the screen resulting in a pattern corresponding to the holes in the screen.

Figure 2:
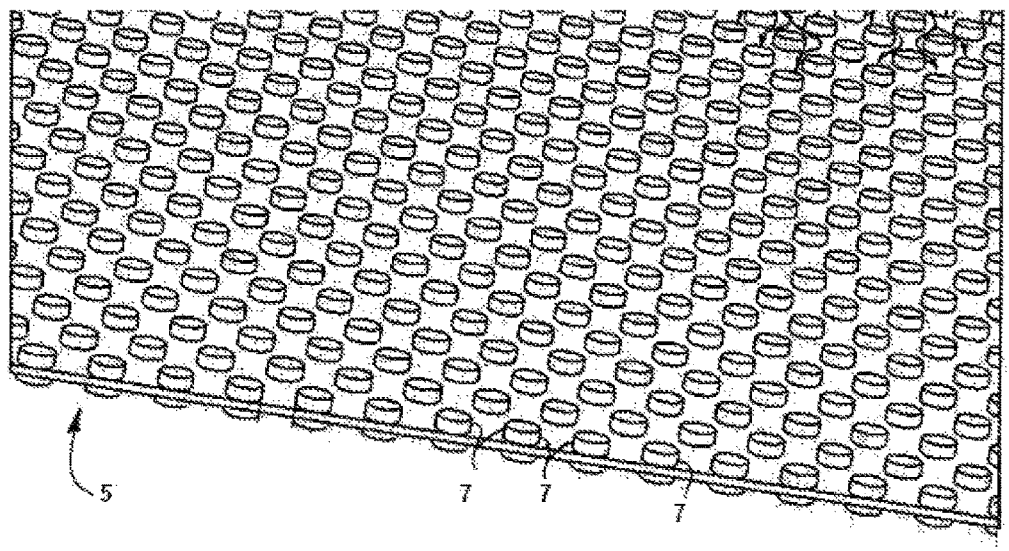
FIG. 2 is a schematic representation of an ion-exchange membrane having a textured surface profile on both sides, prepared by the present process.

FIG. 2 illustrates an ion exchange membrane (5) having a textured surface profile on both sides. The texture takes the form of regular, equally sized conical protrusions (7), resembling a double-sided Lego™ board. In FIG. 2 the Texture % is <50% (Texture % is defined below).

Figure 3A:
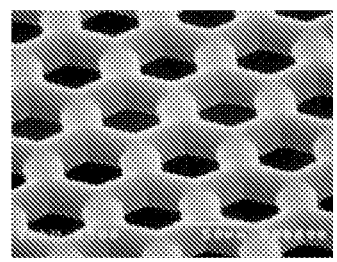
FIGS. 3a and 3b illustrate meshes which may be used to prepare screens for application in step (i) of the present process.
Figure 3B:
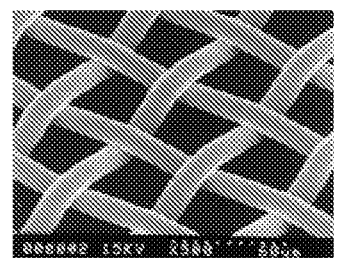

FIGS. 3a and 3b are magnified areas of non-woven and a woven meshes which may be used in step (i) of the present process.

In step (i) the radiation-curable composition may be applied to the membrane in a patternwise manner using any desired technique, for example by a printing method. Suitable printing methods include inkjet printing, offset printing, gravure printing and especially screen printing.

Printing enables the radiation-curable composition to be applied to the membrane in a patternwise manner in step (i) and the radiation-curable composition can then be cured in step (ii), e.g. to "lock in" the three-dimensional pattern so created.

The preferred screen-printing method for applying the radiation-curable composition to the membrane in a patternwise manner comprises applying the radiation-curable composition to one side of a screen such that a part of the radiation-curable composition passes through openings in the screen and a part of the radiation-curable composition is blocked by the screen and remains on the side of the screen to which it was applied. Typically a printing pressure is applied to the radiation-curable composition in order to force a part of the radiation-curable composition through openings in the screen and onto the membrane on the opposite side of the screen. The printing pressure may be applied by any suitable means, for example by means of a squeegee or blade, e.g. a "fill blade". The squeegee or blade may be moved across the screen, forcing the radiation-curable composition through openings in the screen.

The screen usually comprises a mesh, e.g. a woven or non-woven mesh, and may be formed of any suitable substance (e.g. paper, plastic, or metal or two or more thereof). The mesh comprises openings which allow the radiation-curable composition to pass through and deposit onto the membrane to provide the desired surface profile.

A woven mesh typically comprises a network of wires or threads with gaps between the wires or threads through which the composition may pass (e.g. as illustrated in FIG. 3b).

Alternatively the screen may comprise a non-woven mesh, as illustrated in FIG. 3a. Screens comprising a non-woven mesh may be prepared by a process comprising electrolytically forming a metal screen by forming in a first electrolytic bath a screen skeleton upon a matrix provided with a separating agent, stripping the formed screen skeleton from the matrix and subjecting the screen skeleton to an electrolysis in a second electrolytic bath in order to deposit metal onto said skeleton. This technique can be used to prepare non-woven metal screens for screen printing with various mesh sizes (e.g. from 75 to over 350 ), thicknesses (e.g. from about 50 to more than 300 micrometer), and hole diameters (e.g. from 25 micrometer and greater) and thus various amounts of open area (e.g. from about 10 to about 55%), texture thicknesses (e.g. from about 5 to more than 350 micrometer thick) and resolutions (e.g. from about 90 to 350 micrometer). Indeed, the use of non-woven screens in the present process can result in improved screen lifetime, sturdiness and stability, resistance to wrinkling with virtually no breakages or damage during press set-up or printing. The radiation-curable composition can be screen-printed onto the membrane in a patternwise manner in step (i) and the printed radiation-curable composition may then be cured in step (ii).

The screen can be reused to repeatedly and rapidly produce textured ion-exchange membranes. Thus in a preferred aspect the present invention the process is a continuous process.

In a preferred embodiment the process is a continuous process wherein the radiation-curable composition is applied to the membrane while the membrane is moving. The continuous process may be performed by means of a manufacturing unit comprising a screen-printing station, an irradiation source for curing the composition, a textured membrane collecting station and a means for moving the membrane from the screen-printing station to the irradiation source and to the textured membrane collecting station.

As examples of ion-exchange membranes there may be mentioned anion-exchange membranes and cation-exchange membranes.

Steps (i) and (ii) may be performed once or more than once, to one or both sides of a membrane. For example one may create a complex textured surface profile by applying more than one pattern of radiation-curable composition to one or both sides of the membrane. The radiation-curable composition may be different for every different printing step or may be the same.

When steps (i) and (ii) are performed on both sides of a membrane to provide an ion-exchange membrane having a textured surface profile on both sides, the steps are optionally performed on each side of the membrane sequentially (i.e. steps (i) and (ii) are performed on one side and then on the other side) or simultaneously (i.e. steps (i) and (ii) are performed on both sides of the membrane at the same time).

The screen-printing may use a flat screen or a curved screen, for example a tubular (cylindrical) screen. Tubular screens are particularly useful for performing the present process by rotary screen-printing. Thus, in one embodiment, the screen-printing comprises screen-printing the radiation-curable composition through a tubular screen wherein the radiation-curable composition is applied to the inside of the tubular screen, optionally using a squeegee or blade. A printing force may be used to force the composition through holes in the screen and onto the membrane or substrate. The tubular screen may be rotated during the process in order to continuously apply the radiation curable composition in a patterned manner to the membrane, e.g. to a reel of the membrane which is continuously unwound and fed to the rotating screen. Preferably the screen-printing comprises applying the radiation-curable composition to the membrane through a rotating, tubular screen, e.g. to a membrane which is being unwound from a reel. This may be referred to as "reel-to-reel" screen printing. This is a particularly preferred process for producing textured membranes in a rapid and continuous manner. Alternative processes such as "sheet-to-sheet" and "reel-to-sheet" screen printing may also be used. Suitable screen printing processes other than rotary screen-printing include: flatbed screen-printing (carousel, reel-to-reel or sheet-to-sheet) and rotary-stop-cylinder screen-printing (reel-to-reel or sheet-to-sheet).

In one embodiment the screen comprises a mesh, typically a mesh constructed from a metal (e.g. nickel or stainless steel) or from a textile material (e.g. a polymeric fabric or a woven textile material). The mesh usually has a regular pattern of openings.

Optionally the screen further comprises a stencil (also called a screen mask). The stencil limits the areas of the screen through which the radiation-curable composition may pass.

Preferred screens comprise a mesh having mesh number of 10 to 2400, more preferably 50 to 1000, especially 60 to 400. The mesh number is the number of openings per inch (2.54 cm). Preferred screens comprise a mesh having a thickness of 10 to 1000 µm, more preferably 50 to 400 µm. These preferred screens are preferably combined with a stencil. For screens used without a stencil the mesh preferably corresponds to the desired textured surface profile and may have a mesh number of, for example, 2 to 200, or a pattern that cannot be characterised by a mesh number (e.g. in the case of a non-woven mesh).

The cross-sectional area of the mesh through which the radiation-curable composition may pass, relative to the total area of the mesh, i.e. the percentage of the mesh area that is 'Ink permeable', is referred to as the "open area %". The mesh used in the process of the present invention preferably has an open area % of 1 to 80%, more preferably 10 to 70%, especially 30 to 60%.

When the screen printing is performed using a screen comprising a stencil, the stencil may be on the side of the screen nearest to the membrane and then the stencil also contributes to the thickness of radiation-curable composition printed onto the membrane. In this case the screen (including the stencil) preferably has a thickness of 20 to 1000 µm, more preferably 40 to 600 µm.

The component parts of the screen (e.g. the stencil (when present)) and the mesh can be made from any suitable material, for example a photosensitive polymer (e.g. an epoxy resin) for the stencil and stainless steel, glass, polyester, e.g. polyethyleneterephthalate, and nylon for the other components of the screen (e.g. the mesh or non-woven sheet material comprising openings).

Examples of commercially available meshes include RotaMesh® (non-woven mesh), from SPG Prints, The Netherlands, and Screeny Printing Plates from Gallus, Switzerland, for Rotary Screen Printing. RotaMesh® meshes include 75/40, 75/32, 125/15, 215/25, 215/21, 305/17, 305/13, 305/11, 305/8 and 405/17 (the first number is the mesh number and the second number is the open area %). For flatbed screen printing, examples of suitable meshes include JMC Monoplan Mesh and Wängi Mesh from Druma, The Netherlands, stainless steel meshes from Reking, China, and Newman Roller Mesh® from Stretch Devices, Inc., USA.

In a preferred embodiment the radiation-curable composition applied to the membrane forms a textured surface profile of (uncured) radiation-curable composition, forming so-called protrusions, has an average height (or thickness) of 5 μm to 500 μm, especially 10 μm to 300 μm. One may achieve the desired height (or thickness) by the choice of screen thickness (e.g. the thickness of the mesh, its open area %, stencil thickness (when used)), the process conditions (e.g. the temperature and time interval between printing and curing) and the viscosity of the radiation-curable composition.

The resultant surface profile is influenced by a number of factors, for example the application method, the gap between the screen and the membrane during screen-printing, the squeegee and the pressure applied by the squeegee or blade. In a preferred embodiment, for flatbed types of screen-printing the printing is performed such that there is a gap between the screen and the membrane or substrate of 0.5 mm to 5 cm. For rotary screen-printing no gap is used.

Preferably the squeegee (when used) is made of rubber, e.g. neoprene, or polyurethane and has a Shore A hardness of 50 to 100. Preferably the radiation-curable composition is applied to the screen using a uniform pressure.

The curing in step (ii) is performed when the radiation-curable composition is present on the membrane. In this way, the composition may bond to the membrane and provide the desired surface texture thereon.

In step (ii) the composition may be cured by irradiation with electromagnetic radiation (e.g. ultraviolet light or an electron beam).

The source of radiation may be any source which provides the wavelength and intensity of radiation necessary to cure the composition. A typical example of a UV light source for curing is a D-bulb with an output of 600 Watts/inch (240 W/cm) as supplied by Fusion UV Systems. Alternatives are the V-bulb and the H-bulb from the same supplier.

When no photoinitiator is included in the composition, the composition can be cured by electron-beam exposure, e.g. using an exposure of 50 to 300 keV. Curing can also be achieved by plasma or corona exposure.

During curing, some or all components of the composition polymerise to form the desired surface profile. If desired further curing may be applied subsequently to finish off, although generally this is not necessary.

Preferably step (ii) begins within 2 minutes, more preferably within 60 seconds, of the composition being applied to the membrane.

Preferably the curing is achieved by irradiating the composition for less than 30 seconds, more preferably less than 10 seconds, especially less than 3 seconds, more especially less than 2 seconds. In a continuous process the irradiation occurs continuously and the speed at which the composition moves through the beam of irradiation is mainly what determines the time period of irradiation. Preferably the irradiation uses ultraviolet light. Suitable wavelengths are for instance UV-A (390 to 320 nm), UV-B (320 to 280 nm), UV-C (280 to 200 nm) and UV-V (445 to 395 nm), provided the wavelength matches with the absorbing wavelength of any photoinitiator included in the composition.

Suitable sources of ultraviolet light include mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In most cases lamps with emission maxima between 200 and 450 nm are particularly suitable.

The energy output of the irradiation source is preferably from 20 to 1000 W/cm, preferably from 40 to 500 W/cm, more preferably from 50 to 240 W/cm, but may be higher or lower as long as the desired exposure dose can be realized. The exposure intensity is one of the parameters that can be used to control the extent of curing which can influences the final surface profile. Preferably the exposure dose is at least 40 mJ/cm2, more preferably between 40 and 1500 mJ/cm2, most preferably between 70 and 900 mJ/cm2 as measured using a High Energy UV Radiometer (UV PowerMap™ from EIT, Inc) in the UV-A and UV-B range indicated by the apparatus.

To reach the desired exposure dose at high printing speeds, more than one UV lamp may be used, so that the composition is irradiated more than once.

The thickness of the membrane used in the process (i.e. before the composition has been applied thereto), is preferably less than 500 μm, more preferably less than 200 μm, especially between 10 and 150 μm, e.g. between 20 and 100 μm.

Preferably the resultant membrane having a textured surface profile (abbreviated to "textured membrane") has an ion exchange capacity of at least 0.3 meq/g, more preferably of at least 0.5 meq/g, especially more than 1.0 meq/g, based on the total dry weight of the textured membrane.

Preferably the textured membrane has a charge density of at least 20 meq/m$^2$, more preferably at least 30 meq/m$^2$, especially at least 40 meq/m$^2$, based on the area of a dry membrane.

Preferably textured anion exchange membranes obtained by the present process have a permselectivity for small anions such as Cl$^-$ of more than 75%, more preferably of more than 80%, especially more than 85% or even more than 90%. Preferably textured cation exchange membranes membrane obtained by the present process have a permselectivity for small cations such as Na$^+$ of more than 75%, more preferably of more than 80%, especially more than 85% or even more than 90%.

Preferably the textured membrane has an electrical resistance less than 10 ohm·cm$^2$, more preferably less than 5 ohm·cm$^2$, most preferably less than 3 ohm·cm$^2$. Preferably the textured membrane exhibits a swelling by volume in water of less than 50%, more preferably less than 20%, most preferably less than 10%. The degree of swelling can be controlled by selecting appropriate parameters in the irradiation step (ii).

The water uptake of the textured membrane is preferably less than 50% based on weight of dry textured membrane, more preferably less than 40%, especially less than 30%.

Electrical resistance, permselectivity and % swelling in water may be measured by the methods described by Dlugolecki et al, J. of Membrane Science, 319 (2008) on pages 217-218.

Typically the textured membrane is substantially non-porous e.g. the pores are smaller than the detection limit of a standard Scanning Electron Microscope (SEM). Thus using a Jeol JSM-6335F Field Emission SEM (applying an accelerating voltage of 2 kV, working distance 4 mm, aperture 4, sample coated with Pt with a thickness of 1.5 nm, magnification 100,000×, 3° tilted view) the average pore size is generally smaller than 5 nm, preferably smaller than 1 nm.

The texture of the textured surface profile preferably takes the form of protrusions. The pattern of the protrusions can be varied widely and may be irregular, although they are preferably regular because this can result in a textured membrane having uniform permeation properties across at least 90% of its surface. Examples of suitable protrusions include circular cones, multi-angular pyramids (e.g. triangular pyramidal, square pyramidal and hexagonal pyramidal), hemispheres, mesas (e.g. square, triangular and circular mesas), domes, circular truncated cones, truncated pyramids, diamonds, short ridges, and combinations of two or more of the foregoing. An alternative texture takes the form of ribs, e.g. parallel ribs, on one or both sides of the membrane. When the texture comprises ribs on both sides of the membrane the ribs on each side of the membrane may have the same or a different orientation to the ribs on the other side of the membrane. For example, the direction of the ribs on one side of the membrane is optionally the same as or different to the direction of the ribs on the other side of the membrane. When the direction of the ribs on one side of the membrane is different to the direction of the ribs on the other side of the membrane the angle between the directions of the ribs on the two sides of the membrane is preferably from 30 to 150°, more preferably 60 to 120°.

The extent to which the membrane is textured (i.e. the Texture %) may be expressed by the following equation:

Texture %=(Area of Texture/Total Membrane Area)×100% wherein:
Area of Texture is the area of the membrane which extends outward from the plane of the membrane on the relevant side, measured where the texture meets the plane of the membrane (e.g. the base area of protrusions); and
Total Membrane Area is the total effective area the relevant side of the membrane would have if it were flat and not textured (effective means the area that comes into contact with liquid when the membrane is in use, i.e. excluding the area of the membrane which forms the water-tight seal).

The preferred Texture % depends on whether or not the part of the membrane which extends outward from the plane of the membrane (e.g. protrusions) is ionically charged.

When the part of the membrane which extends outward from the plane of the membrane is not ionically charged, the Texture % is preferably low, for example less than 25%, more preferably less than 15%, especially less than 9%, e.g. 7%, 5%, 4% or 2%.

When the part of the membrane which extends outward from the plane of the membrane is ionically conductive (i.e. capable of conducting ions), which is preferred, the Texture % may be higher because the protrusions typically do not interfere with the ability of the membrane to transport ions. Thus when the part of the membrane which extends outward from the plane of the membrane is ionically-conductive, the Texture % is preferably 1 to 70%, more preferably 2 to 40%, especially 4 to 30%. For some embodiments, a low Texture % may be suitable even when the part of the membrane which extends outward from the plane of the membrane is ionically-conductive, e.g. to reduce fouling. Under these circumstances, the Texture % may be, for example, 21 to 29%, or 11 to 18% or even 6 to 9%.

When the membranes are rather stiff and the protrusions are not ionically charged, or have a tip which is not ionically conductive, only a few protrusions are needed. In this case, the Texture % may be very low, e.g. 1.5 to 4% or even below 1%.

In one embodiment the texture of the textured surface profile comprises protrusions which are not ionically conductive, or protrusions which have a tip which is not ionically conductive, and the average amount of such protrusions is less than 1 per $cm^2$, or alternatively 1.5 to 4 per $cm^2$.

Preferably the part of the membrane which extends outward from the plane of the membrane (i.e. the protrusions) is ionically conductive (i.e. ionically charged) because this avoids the so called 'shadow effect' where the effective surface area of the membrane is reduced. This may even enhance the efficiency of the membranes by enlarging the effective ion-conducting surface area of the membranes relative to the volume of the liquid stream.

Thus a relatively large Texture % may be used when the part of the membrane which extends outward from the plane of the membrane is ionically-conductive without detrimental effect on the performance of the membrane.

Preferably the textured surface profile comprises protrusions which have an average length (L) to average width (W) ratio of 10:1 to 1:10, more preferably 7:1 to 1:7, especially 5:1 to 1:5, more especially 2.5:1 to 1:2.5, when measured at the base of the protrusion. These preferences arise because better convection and lower blockage problems can often be obtained with the aforementioned L to W ratios than when continuous ribs are used where a particle may completely block the passage of liquid between two ribs.

Preferably the textured surface profile comprises protrusions which have an average height (H) of 5 to 500 µm, more preferably 10 to 300 µm. In one embodiment H is 120 to 300 µm.

In another embodiment, H is 55 to 95 µm, or 15 to 45 µm.

Preferably H is smaller than L and W. This preference arises because it may reduce membrane swelling and curl when the membrane is used.

Preferably the textured surface profile comprises protrusions at least 80% (preferably 100%) of which have a maximum dimension in all directions (length, width and height) of less than 20 mm. Preferably the textured surface profile comprises protrusions which have a maximum dimension in all directions (length, width and height) of 0.04 to 10 mm, more preferably 0.05 to 6 mm.

Preferably the textured surface profile comprises protrusions which are separated from each other by an average of at least 0.1 mm, more preferably at least 0.5 mm, e.g. by 1, 2, 4, 8 or 12 mm.

The curable ionic compound comprises an anionic group or a cationic group. Depending on the pH of the composition, these groups may be partially or wholly in salt form. The curable ionic compound may be rendered curable by the presence of one or more (preferably one and only one) ethylenically unsaturated group.

Preferred curable anionic compounds comprise an acidic group, for example a sulpho, carboxy and/or phosphato group. Preferably the curable anionic compound comprises a sulpho group. The preferred salts are lithium, ammonium, sodium and potassium salts and mixtures comprising two or more thereof.

Examples of curable ionic compounds comprising an anionic group include acrylic acid, beta carboxy ethyl acrylate, maleic acid, maleic acid anhydride, vinyl sulphonic acid, phosphonomethylated acrylamide, (2-carboxyethyl) acrylamide, 2-(meth)acrylamido-2-methylpropanesulfonic acid, mixtures comprising two or more thereof and salts thereof.

Preferred curable cationic compounds comprise a quaternary ammonium group. Examples of such compounds include (3-acrylamidopropyl) trimethylammonium chloride, 3-methacrylamidopropyl trimethyl ammonium chloride, (ar-vinylbenzyl) trimethylammonium chloride, (2-(methacryloyloxy)ethyl) trimethylammonium chloride, [3-(methacryloylamino)propyl] trimethyl ammonium chloride, (2-acrylamido-2-methylpropyl) trimethylammonium chloride, 3-acrylamido-3-methylbutyl trimethyl ammonium chloride, acryloylamino-2-hydroxypropyl trimethyl ammonium chloride, N-(2-aminoethyl)acrylamide trimethyl ammonium chloride and mixtures comprising two or more thereof.

Preferably the composition comprises 12 to 60 wt %, more preferably 15 to 55 wt %, especially 20 to 50 wt %, of curable ionic compound(s).

The preferred ethylenically unsaturated groups are (meth) acrylic groups, more preferably (meth)acrylate or (meth) acrylamide groups, especially acrylic groups, e.g. acrylate or acrylamide groups.

Preferably the molecular weight of component b) satisfies the equation:

$$(W \times m) > \text{molecular weight of the crosslinking agent}$$

wherein:
m is the number of ethylenically unsaturated groups present in the crosslinking agent; and m is 2 to 6, more preferably 2 to 4, especially 2 or 3, more especially 2; and
W is 350, more preferably 200, especially 100, more especially 85 or 77.

The lower values of W mentioned above are preferred because the resultant crosslinking agents crosslink more efficiently than when W is higher. Thus preferably the molecular weight of the crosslinking agent is less than or equal to 700 Daltons.

Examples of crosslinking agents which may be used as component b) include (meth)acrylic crosslinking agents, for example tetraethylene glycol diacrylate, polyethyleneglycol (200) diacrylate, dipropylene glycol diacrylate, tripropylene glycol diacrylate, propoxylated ethylene glycol diacrylate, bisphenol A ethoxylate (1.5) diacrylate, tricyclodecane dimethanol diacrylate, propoxylated (3) tri methylolpropane triacrylate, pentaerythriol triacrylate, pentaerythritol tetraacrylate, ethoxylated (4) pentaerythritol tetraacrylate, dipentaerythritol pentaacrylate, and the methacrylic versions of the foregoing.

The term '(meth)' is an abbreviation meaning that the 'meth' is optional, e.g. N,N'-methylene bis(meth)acrylamide is an abbreviation for N,N'-methylene bis acrylamide and N,N'-methylene bis methacrylamide.

Most preferably the crosslinking agent of component b) comprises acrylamide groups.

Examples of crosslinking agents which may be used as component b) having from two to six acrylamide groups include N,N'- methylene bisacrylamide, N,N'-ethylene bisacrylamide, N,N'-propylene bisacrylamide, N,N'-butylene bisacrylamide, N,N'-(1,2-dihydroxyethylene) bisacrylamide, 1,4-diacryloyl piperazine, 1,4-bis(acryloyl)homopiperazine, triacryloyl-tris(2-aminoethyl)amine, triacroyl diethylene triamine, tetra acryloyl triethylene tetramine and 1,3,5-triacryloylhexahydro-1,3,5-triazine.

Component b) consists of one or more than one crosslinking agent (preferably one crosslinking agent or 2 to 5 crosslinking agents). Preferably the composition comprises 4 to 55 wt %, more preferably 4 to 50 wt %, especially 5 to 40 wt %, more especially 9 to 25 wt % of component b).

The inclusion of an inert solvent can be useful for reducing the viscosity and/or surface tension of the composition, making the process easier in some respects and also enhance permeation of the composition through the screen, and for dissolving the solid components of the composition.

The inert solvent may be any solvent which does not copolymerise with component a) or b) during the process. An inert solvent comprising an inert organic solvent and water is advantageous, especially where some or all of the inert organic solvent is water-miscible. The water is useful for dissolving component a) and the inert organic solvent is useful for dissolving organic components of the composition.

In one embodiment, the inert solvent comprises at least 50 wt % water, more preferably at least 70 wt % water, relative to the total amount of inert solvent. Thus the inert solvent preferably comprises less than 30 wt % inert organic solvent and any remaining inert solvent is water. In one embodiment the composition is free from inert organic solvents, providing environmental advantages due to the complete absence of organic inert solvents.

Preferably the composition comprises 5 to 50 wt %, more preferably 6 to 45 wt %, especially 10 to 35 wt % of component c). In one embodiment just enough inert solvent is used to dissolve the components of the composition, e.g. the amount of solvent is no more than 5 wt % more than is necessary to dissolve the rest of the composition at the temperature at which the composition is applied to the membrane. This has the advantage of enhancing permselectivity of the textured membrane and reducing the swelling of the protrusions.

Preferred inert organic solvents include $C_{1-4}$-alcohols (e.g. mono ols such as methanol, ethanol and propan-2-ol); diols (e.g. ethylene glycol and propylene glycol); triols (e.g. glycerol)); carbonates (e.g. ethylene carbonate, propylene carbonate, dimethyl carbonate, diethyl carbonate, di-t-butyl dicarbonate and glycerin carbonate); dimethyl formamide; acetone; N-methyl-2-pyrrolidinone; and mixtures comprising two or more of the foregoing. A particularly preferred organic solvent is propan-2-ol.

In one embodiment the inert organic solvent has a low boiling point, e.g. a boiling point below 100° C. Inert solvents having a low boiling point can be easily removed by evaporation, potentially avoiding the need for a washing step for removal of the solvent.

In one embodiment the composition is free from free-radical initiators. When the composition is free from free-radical initiators it may be cured using electron beam radiation.

Preferably the composition comprises 0 or 0.01 to 10 wt %, more preferably 0.05 to 5 wt %, especially 0.1 to 2 wt %, of component d). The composition may comprise one or more than one photoinitiator as component d).

For acrylamides, diacrylamides, and higher-acrylamides, type I photoinitiators are preferred. Examples of type I photoinitiators are as described in WO 2007/018425, page 14, line 23 to page 15, line 26, which are incorporated herein by reference thereto. Especially preferred photoinitiators include alpha-hydroxyalkylphenones, e.g. 2-hydroxy-2-methyl-1-phenylpropan-1-one and 2-hydroxy-2-methyl-1-(4-tert-butyl-) phenylpropan-1-one, and acylphosphine oxides, e.g. 2,4,6-trimethylbenzoyl-diphenylphosphine oxide, and bis(2,4,6-trimethylbenzoyl)-phenylphosphine oxide.

When a photoinitiator is present in the composition, preferably a polymerization inhibitor is also included (e.g. in an amount of below 2 wt %). This is useful to prevent premature curing of the composition during, for example, storage. Suitable inhibitors include hydroquinone, hydroquinone mono methyl ether, 2,6-di-t-butyl-4-methylphenol, 4-t-butyl-catechol, phenothiazine, 4-oxo-2,2,6,6-tetramethyl-1-piperidinoloxy, free radical, 4-hydroxy-2,2,6,6-tetramethyl-1-piperidinoloxy, free radical, 2,6-dinitro-sec-butylphenol, tris(N-nitroso-N-phenylhydroxylamine) aluminum salt, Omnistab™ IN 510 and mixtures comprising two or more thereof.

The radiation-curable composition optionally further comprises an anti-foaming agent. Examples of anti-foaming agents include silicon-based anti-foaming agents (e.g. several TEGO® antifoam agents from Evonik (Foamex, Airex)); several Surfynol™ (e.g. DF58, DF62, DF66, and DF178 and DF695) and Airase anti-foaming agents from Air Products; Silcolapse® from Bluestar™ Silicones; several anti-foaming agents from Silchem; Octosperse from Tiarco Chemical; several SILFOAM® compounds from Wacker; several BYK anti-foaming agents (e.g. BYK-1740, BYK-1770, BYK-1780, BYK-1785 and BYK-1798) from BYK Chemie); alkoxylates (e.g. several DOWFAX™ anti-foaming agents from Dow); several anti-foaming agents from Ineos; and others such as BYK-012, BYK-016, BYK-052, BYK-057, BYK-081, BYK-088, BYK-1790 and BYK-1794 from BYK Chemie and Surfynol™ DF-70 and DF-220 from Air Products.

Preferably the radiation-curable compositions contain 0.04 to 2 wt %, more preferably 0.1 to 1.0 wt % of anti-foaming agent.

The radiation-curable composition used in step (i) preferably has a high viscosity when measured at a low shear rate (this helps to retain the surface profile arising from the screen-printing step until such time as the composition is cured).

Furthermore, the radiation-curable composition used in step (i) preferably has a low viscosity when measured at a high shear rate (this helps the composition to flow smoothly when it is forced through holes in the screen).

Thus, in a preferred embodiment, the radiation-curable composition used in step (i) preferably has a viscosity of 30 to 1000 Pa·s (more preferably 50 to 900 Pa·s) when measured at a shear rate of $0.1\ s^{-1}$ at 20° C. and a viscosity of <20 Pa·s (more preferably <5 Pa·s) when measured at a shear rate of $1000\ s^{-1}$ at 20° C. The viscosity when measured at a shear rate of $1000\ s^{-1}$ at 20° C. is preferably >0.2 Pa·s, more preferably >0.5 Pa·s, e.g. about 1 Pa·s.

The Physica MCR301 rheology meter from Anton Paar GmbH is a suitable machine to measure the specific shear rate and time dependent rheological parameters. Preferably the rheological parameters (e.g. viscosity) are measured at 20° C. using the cone-plate in rotation mode.

The thickening agent e) is useful for ensuring that the radiation-curable composition retains its three-dimensional shape during the time window between applying and curing of the composition. The thickening agent is preferably a compound or combination of compounds that is capable of bringing the viscosity of the radiation-curable composition when measured at a shear rate of $0.1\ s^{-1}$ at 20° C. to a value of at least 30 Pa·s, preferably at least 50 Pa·s, while at the same time providing a viscosity when measured at a shear rate of $1000\ s^{-1}$ at 20° C. of less than 20 Pa·s, preferably less than 5 Pa·s.

The ratio of the viscosity of the radiation-curable composition when measured at a shear rate of $0.1\ s^{-1}$ to the viscosity when measured at a shear rate of $1000\ s^{-1}$ is preferably between 1.5 and 5000, more preferably between 10 and 800, especially between 40 and 600, when measured at 20° C. In order to achieve a desired combination of desired viscosities at low and high shear rates, the thickening agent preferably is or comprises a rheology modifier.

Rheology modifiers include polyhydroxycarboxylic acid amides (e.g. BYK®-405, BYK®-R605); polyhydroxycarboxylic acid esters (e.g. BYK®-R606); modified ureas (e.g. BYK®-410, BYK®-420 ); urea-modified polyurethanes (e.g. BYK®-425); branched polyurethanes (e.g. BYK®-428); hydrophobically modified alkali swellable or solluble emulsions (e.g. Solthix® A100 from Lubrizol, several Eka Flow polymers from AkzoNobel); N-(2-hydroxyethyl)ethylenediamine, several Acrysol™ rheology modifiers from Dow®, hydrophilic polymers soluble in the composition, and combinations thereof. Preferred hydrophilic polymers include polyvinyl alcohol, polyethyleneglycol, poly(vinylpyrrolidinone), poly(acrylic acid), poly(2-oxazoline), polyethylenimine, polyacrylamide, poly(N-isopropylacrylamide), polyethers, maleic anhydride copolymers and polyelectrolytes.

Particulate solids may also be used as thickening agents, alone or optionally in combination with a rheology modifier. Preferred particulate solids include inorganic fillers, for example crystalline and amorphous silica, carbon black, clay particles, aluminum silicate, metal oxides (e.g. titanium dioxide, iron oxide, aluminium oxide) and metal carbonates (e.g. calcium carbonate), and the like. Furthermore, the particulate solid can also improve the robustness of the texture on the resultant textured membrane, increasing its abrasion resistance. Examples of particulate solids include optionally organically modified hydrophilic (fumed or precipitated) metal oxides such as $SiO_2$, $TiO_2$ and $Al_2O_3$ (e.g. several Aerosil® grades from Evonik, several HDK® agents from Wacker, several Xysil grades from Xunyu Chemical, several CAB-O-SIL® products from Cabot, Laevisil SP from Baerlocher); natural and synthetic clays, e.g. smectites and hormites, e.g. hectorites, laponites, bentonites and aluminum silicates (e.g. several Bentolite® products from BYK® and several Bentone® products from Elementis).

Preferably the particulate solid, when present, has an average particle size below 1 μm, more preferably below 50 nm, especially below 30 nm, e.g. around 7 nm or around 20 nm. The particle size is related to the specific surface area as may be determined by the Brunauer, Emmett and Teller (BET) method of adsorption of nitrogen gas. The particulate solid, when present, preferably has a specific surface area >50 $m^2/g$, more preferably >150 $m^2/g$, especially >250 $m^2/g$.

In general a combination of additives gives better results. Thus the composition may comprise a combination of several thickening agents, for example several particulate solids and/or rheology modifiers.

Preferably the composition comprises 1 to 15 wt %, more preferably 2 to 12 wt %, especially 3 to 9 wt %, of component e).

The radiation-curable composition used in step (i) optionally further comprises f) a crosslinking agent comprising at least two ethylenically unsaturated groups and having a NAMW of at least 800 Daltons, e.g. from 800 to 8,000 Daltons.

The crosslinking agents (components b) and f), when present) preferably have two to six ethylenically unsaturated groups, more preferably two or three, especially two ethylenically unsaturated groups.

Commercially available crosslinking agents which may be used as component f) are available from Sartomer and include aliphatic urethanes (e.g. CN9002, CN910, CN9245S, CN962, CN964, CN965, CN966, CN991, CN996 and CN998); aromatic urethanes (e.g. CN9761 and CN9170 ); polyester acrylates (e.g. CN2203, CN2609 and CN704); epoxy-functional oligomers (e.g. CN186, CN790, CN2003EU and CNUVE150/80 ); silicone oligomers (e.g. CN9800 and CN990 ); melamine oligomers (e.g. CN9890 ); acrylic oligomers (e.g. CN146, CN704, CN816, CN820, CN821, CN823 and CN824).

Further examples of commercially available crosslinking agents which may be used as component f) are available from Allnex and include aliphatic and aromatic urethane acrylates such as UCECOAT 6569, UCECOAT 7655, IRR 598, Ebecryl 244, Ebecryl 264, Ebecryl 2002, Ebecryl 2003, Ebecryl 204, Ebecryl 205, Ebecryl 210, Ebecryl 215, Ebecryl 230, Ebecryl 245, Ebecryl 265, Ebecryl 6202, polyester acrylates such as Ebecryl Leo 10801, Ebecryl 2047, Ebecryl 524, Ebecryl 525 Ebecryl 870, Ebecryl 881, epoxy acrylates such as Ebecryl Leo 10601, Ebecryl 3420, Ebecryl 3608, Ebecryl 3639, Ebecryl 3703, Ebecryl 3708, Ebecryl 604, Ebecryl 605, Ebecryl 608, acrylic oligomers such as Ebecryl 740/40 and Ebecryl 7100.

Still further examples of commercially available crosslinking agents which may be used as component f) are available from BOMAR and include polycaprolactone urethane acrylates such as XRC-841, polyether urethane acrylates such as BR-144, BR-302, BR-344, BR-3641AJ, BR-371S, BR-374, BR-543, BR-571, BR-582, polyester urethane acrylates such as BR-441 B, BR-471, BR-704P, BR-741, BR-742P, BR-7432GB, BR-7432GI30, BR-744P and multifunctional acrylate such as BR-970 BT, BR-990 and XMA-2245.

Further examples of commercially available crosslinking agents which may be used as component f) include GENOMER 1122, 2252, 2255, 4215, 4302, 4312, 4316 and 4690, and UA 00-022, available from Rahn; PHOTOMER 6892, 6230 and 6008 available from IGM Resins; NK OLIGO™ U-15HA, UA-W2A, UA-7100, UA-200PA and UA-290TM available from SHIN-NAKAMURA CHEMICAL CO. Ltd.; LAROMER LR8987 from BASF; and VERBATIM HD50 and PHVX55 from CHEMENCE.

Preferably the composition comprises 1 to 15 wt %, more preferably 1.5 to 12 wt %, especially 2 to 10 wt %, e.g. 4 or 6 or 8 wt % of component f).

The composition may contain other components, for example curable compounds which are free from ionic groups (e.g. methyl (meth)acrylate, N-(2-hydroxyethyl) acrylamide etc.), acids, pH controllers, preservatives, viscosity modifiers, stabilisers, dispersing agents, organic/inorganic salts, anionic, cationic, non-ionic and/or amphoteric surfactants, buffers and the like.

The preferred pH for the composition depends to some extent on whether the curable ionic compound is in the free acid or salt form and whether the ionic group is anionic or cationic. Preferably the composition has a pH of 0.5 to 12. When the curable ionic compound carries an anionic group and is at least 95% in the salt form the composition preferably has a pH of 0 to 10, more preferably 0.5 to 6.

When the curable ionic compound carries a cationic group the composition preferably has a pH of 2 to 10, more preferably 4 to 8.

In a particularly preferred aspect, the radiation-curable composition used in the process of the first aspect of the present invention (which also forms a further feature of the present invention) comprises:
a) 12 to 60 wt % (preferably 20 to 50 wt %) of curable ionic compound(s) comprising one acrylic group and one or more acidic or basic group selected from sulfo, carboxy, phosphato, quaternary amino and tertiary amino groups;
b) 4 to 40 to 45 wt % (preferably 9 to 25 wt %) of crosslinking agent(s) comprising at least two ethylenically unsaturated groups and having a number average molecular weight ("NAMW") below 800;
c) 5 to 50 wt % (preferably 10 to 35 wt %) of inert solvent(s);
d) 0.01 to 10 wt % (preferably 0.05 to 5 wt %) of free-radical initiator(s);
e) 1 to 15 wt % (preferably 2 to 12 wt %) of thickening agent(s) comprising an inorganic filler selected from hydrophilic metal oxides, carbon black, clays and calcium carbonate in a form which has an average particle size below 0.05 μm and/or a BET surface area greater than 50 $m^2/g$ (e.g. greater than 150 50 $m^2/g$); and
f) 1 to 15 wt % (preferably 1.5 to 12 wt %) of crosslinking agent(s) comprising at least two ethylenically unsaturated groups and having a NAMW of 800 to 8,000 Daltons.

The above composition preferably has a viscosity at 20° C. and shear rate of 0.1 $s^{-1}$ of between 30 to 1000 Pa·s and a viscosity at 20° C. and shear rate of 1,000 $s^{-1}$ of between 0.2 and 20 Pa·s.

In one embodiment, when the radiation-curable composition comprises a poorly soluble compound having an acrylamide group such as N,N'-methylene bisacrylamide, the composition preferably further comprises g) a non-curable salt(s) dissolved in the composition, e.g. in an amount of 1 to 45 wt %, more preferably of 2 to 35 wt %.

The non-curable salt can be any salt which is not capable of forming a covalent bond with the crosslinking agent under the conditions used to cure the composition and which dissolves in the radiation-curable composition. Typically the non-curable salt comprises an anionic group derived from an acid (especially an inorganic acid) and a cationic group (especially and inorganic cationic group). The non-curable salt preferably has a solubility in water at 25° C. of at least 250 g/L, more preferably at least 400 g/L. Preferred non-curable salts are inorganic salts, for example inorganic lithium, sodium, potassium, ammonium, magnesium and calcium salts and mixtures comprising two or more such salts. Preferred anions include thiocyanate, chlorate, perchlorate, chlorite, iodide, bromide, nitrate, chloride and nitrite. The anion preferably is other than sulphate, sulphite, phosphate and fluoride.

Preferred non-curable salts include lithium chloride, lithium bromide, lithium nitrate, lithium iodide, lithium chlorate, lithium thiocyanate, lithium perchlorate, lithium tetrafluoroborate, lithium hexafluorophosphate, lithium hexafluoroarsenate, ammonium thiocyanate, ammonium chloride, ammonium iodide, ammonium nitrate, sodium chloride, sodium bromide, sodium nitrate, sodium thiocyanate, calcium nitrate, calcium thiocyanate, calcium bromide, calcium chloride, calcium perchlorate, calcium iodide, calcium tetrafluoroborate, calcium hexafluorophosphate, calcium hexafluoroarsenate, magnesium chloride, magnesium bromide, magnesium nitrate, magnesium thiocyanate, potassium thiocyanate, potassium chlorate, and mixtures comprising two or more such salts. Most preferred are lithium chloride, lithium bromide, lithium hydroxide, lithium nitrate, ammonium nitrate, sodium nitrate, calcium nitrate and mixtures comprising two or more such salts.

Preferably the composition is free from, or substantially free from, methacrylic compounds (e.g. methacrylate and methacrylamide compounds), which are free from acrylic groups and comprise one or more methacrylic groups.

By "substantially free from" we mean contains less than 5 wt %, more preferably less than 2 wt %, especially less than 1 wt %. Thus the composition preferably comprises less than 5 wt %, more preferably less than 2 wt %, especially less than 1 wt % methacrylic compounds.

Thus the preferred composition is free from, or substantially free from, divinyl benzene, styrene and methacrylic compounds.

Optionally the composition comprises further ingredients, e.g. a flow/leveling agent, a slip additive and/or a stabiliser.

Hitherto membranes have often been made in slow and energy-intensive processes, often having many stages. The present invention enables textured, composite membranes to be prepared in a simple process that may be run continuously for long periods of time to mass produce membranes relatively cheaply.

The thickness of the textured, composite membrane, including the texture, is preferably less than 900 μm, more preferably less than 450 μm, especially between 25 and 300 μm, more especially between 50 and 250 μm.

The membrane used in step (i) of the process according to the first aspect of the present invention may be purchased or one may prepare the membrane as part of the overall process for making the textured membrane. The membrane used in step (i) preferably comprises a porous support, although this is not mandatory.

Thus in a second aspect of the present invention, the process further comprises the preparation of the membrane used in step (i) by a process comprising the steps (A) and (B):

(A) impregnating a porous support with a radiation-curable composition;
(B) forming the membrane by irradiating and thereby curing the radiation-curable curable composition present in the porous support.

The process according to the second aspect of the present invention provides surprisingly good adhesion between the membrane and the textured surface profile added in steps (i) and (ii). While not wishing to be bound by any theory, it could be that the adhesion is being enhanced by some of the radiation curable groups still present in the membrane from step (B) polymerising with the radiation curable composition used to form the surface texture in steps (i) and (ii). In a preferred embodiment the membrane comprises ethylenically unsaturated groups at its surface. The presence of such groups can enhance the adhesion between the membrane and the textured surface profile.

In step (A) one may use a radiation-curable compositions as described generally above for step (i), although one will usually omit component e) because this material increases viscosity and therefore reduces the ability of the composition to impregnate the porous support preferably in step (A). Thus preferably the radiation-curable composition used in step (A) preferably comprises no or less particulate solids than the radiation-curable composition used in step (i). The radiation-curable composition used in step (i) preferably has a higher viscosity than the radiation-curable composition used in step (A).

The porous support may also be treated to modify its surface energy, e.g. to values above 45 mN/m, preferably above 55 mN/m.

In order to produce a sufficiently flowable composition for application by a high speed coating machine, it is preferred that the radiation-curable composition used in step (A) has a viscosity below 5000 mPa·s when measured at 35° C., more preferably from 1 to 1500 mPa·s when measured at 35° C. Most preferably the viscosity of the composition used in step (A) is from 2 to 500 mPa·s when measured at 35° C. For coating methods such as slide bead coating the preferred viscosity is from 2 to 150 mPa·s when measured at 35° C.

Photoinitiators may be included in the composition used in step (A), as mentioned above in relation to step (ii), and are usually required when curing uses UV or visible light radiation.

While it is possible to prepare the textured membranes on a batch basis using a stationary support, to gain full advantage of the invention it is much preferred to prepare the textured membrane on a continuous basis by screen-printing a moving membrane. The membrane may be in the form of a roll which is unwound continuously or the membrane may rest on a continuously driven belt (or a combination of these methods). Using such techniques the composition can be applied to the membrane on a continuous basis or it can be applied on a large batch basis.

In the second aspect of the present invention, the porous support may be impregnated with a first curable composition by applying the composition to the porous support by any suitable method, for example by curtain coating, extrusion coating, air-knife coating, slide coating, nip roll coating, forward roll coating, reverse roll coating, dip coating, kiss coating, rod bar coating or spray coating. The coating of multiple layers can be done simultaneously or consecutively.

For convenience we will refer to the radiation-curable composition used in step (A) (i.e. to prepare the membrane which is used in step i)) as the "first radiation-curable composition" and the radiation-curable composition used in step (i) (i.e. the radiation-curable composition which is screen applied to the membrane) as the "second radiation-curable composition".

Thus in a preferred process according to the second aspect of the present invention steps (A), (B), (i) and (ii) are performed continuously, i.e. the process according to the second aspect of the present invention is preferably a continuous process.

The process according to the second aspect of the present invention is preferably performed using a manufacturing unit comprising the following components:

(a) a first curable composition application station for impregnating a porous support with a first radiation-curable composition;
(b) a first irradiation source for irradiating and thereby curing the radiation-curable curable composition present in the porous support, thereby forming a membrane;
(c) a second curable composition application station for applying a second radiation-curable composition onto the membrane;
(d) a second irradiation source for irradiating and thereby curing the membrane carrying the second radiation-curable composition, thereby forming a textured membrane;
(e) a textured membrane collecting station; and
(f) a means for moving the porous support impregnated with the first radiation-curable composition to the first irradiation source, a means for moving the formed membrane to the second curable composition application station, a means for moving the membrane carrying the second radiation-curable composition to the second irradiation source and a means for moving the textured membrane to the textured membrane collecting station.

The curable composition application stations may be located at upstream positions relative to the respective irradiation sources and the irradiation sources are located at an upstream position relative to the textured membrane collecting station.

For convenience the same means may be used for performing all of step (f), for example a series of belts and/or rollers may be used to perform all of the moving mentioned in step (f).

With suitable coating techniques, the curable compositions may be applied to the porous support and membrane while the porous support and/or membrane are moving at a speed of over 5 m/min, e.g. more than 10 m/min or even higher, such as 20 m/min, 30 m/min or up to 100 m/min, can be reached.

Before applying either or both of the curable compositions the surface of the porous support and/or the membrane may be subjected to a corona discharge treatment, glow discharge treatment, plasma treatment, flame treatment, ultraviolet light irradiation treatment or the like, e.g. for the purpose of improving its wettability and the adhesiveness. Treating the support is particularly desired where it is intended for the support to remain in the textured membrane in order to provide mechanical strength.

For improving the adhesiveness of the second radiation-curable composition to the membrane, the membrane may be pre-treated to introduce reactive groups, e.g. by grafting or by treating it with (a solution of) an adhesion promoter, and/or an adhesion promoter may be included in the second radiation-curable composition.

The preferences for the irradiation in step (B) are as described above in relation to step (ii), although of course steps (ii) and (B) may use different wavelengths, irradiation times and intensities, depending on particular radiation-curable compositions used in each of these steps.

In step (ii) and step (B) (when performed), the curing is preferably achieved by irradiating the relevant radiation-curable composition for less than 10 seconds, more preferably less than 5 seconds, especially less than 3 seconds, more especially less than 2 seconds. In a continuous process the irradiation occurs continuously and the speed at which the curable composition moves through the beam of the irradiation is mainly what determines the time period of curing time.

When high intensity UV light is used for curing a considerable amount of heat may be generated. To prevent over-heating one may therefore apply cooling air or cooling liquid to the lamps and/or the support/textured membrane. Cooling rollers may also be used to reduce the temperature of the membrane. Often a significant dose of IR light is irradiated together with the UV-beam. In one embodiment curing is performed by irradiation using UV light filtered through an IR reflecting quartz plate.

The support referred to in step (A) may be a woven or non-woven synthetic fabric, e.g. polyethylene, polypropylene, polyacrylonitrile, polyvinyl chloride, polyester, polyamide, and copolymers thereof, or porous textured membranes based on e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene, polychlorotrifluoroethylene, and copolymers thereof. Commercially available porous supports and strengthening materials are available commercially, e.g. from Freudenberg Filtration Technologies (Novatexx materials) and Sefar AG.

The textured membranes of the invention are primarily intended for use in ion exchange process, e.g. electrodialysis or reverse electrodialysis, especially for the generation of blue energy. However it is envisaged that the textured membranes are also useful for other purposes.

According to a third aspect of the present invention there is provided an ion-exchange membrane having a textured surface profile obtained by a process according to the first or second aspect of the present invention.

According to a fourth aspect of the present invention there is provided use of a textured membrane according to the third aspect of the present invention in an ion exchange process, e.g. in electrodialysis or reverse electrodialysis, for the generation of energy, the treatment of water or for the harvesting of salts and/or metals.

According to a fifth aspect of the present invention there is provided an electrodialysis or reverse electrodialysis unit, an electrodeionization module, a capacitive deionization device (e.g. a flow through capacitor), a diffusion dialysis apparatus or a membrane distillation module, comprising one or more textured membranes according to the present invention. The electrodeionization module is preferably a continuous electrodeionization module.

Preferably the electrodialysis or reverse electrodialysis unit or the electrodeionization module or the flow through capacitor comprises at least one anode, at least one cathode and one or more textured membranes according to the present invention. Further the unit preferably comprises an inlet for providing a flow of salty water through the channel of the cell according to the present invention and—for the reverse electrodialysis unit - an inlet for providing a flow of water having a different solute content along the outside wall(s) of the cell such that ions pass through the membranes.

In a preferred embodiment the unit comprises at least 1, more preferably at least 4, e.g. about 36, 64, 200, 600 or up to 1500, textured membranes according to the first aspect of the present invention, the number of cells being dependent on the application.

The present invention is illustrated by the following Examples in which all parts and percentages are by weight.

In the following Examples the following abbreviations are used:

| | |
|---|---|
| AMPS | is 2-Acryloylamido-2-methylpropanesulfonic acid from Hang-Zhou (China). |
| DMAPAA-Q | is a 75 wt % solution of N,N-Dimethylamino propylacrylamide, methyl chloride quarternary in water from Kohjin (Japan). |
| MBA | is N,N'-methylene bisacrylamide crosslinking agent of NAMW 154 from Sigma Aldrich. |
| BAHP | is 1,4-bis(acryloyl) homopiperazine crosslinking agent of NAMW below 800, synthesized as described in WO 2010/106356. |

-continued

| | |
|---|---|
| CN965 | is an aliphatic urethane diacrylate crosslinking agent of NAMW 5,600 from Sartomer. |
| CN910A70 | is an aliphatic urethane diacrylate crosslinking agent of NAMW 3600, diluted with 30% tripropylene glycol diacrylate, from Sartomer. |
| CN998B80 | is an aliphatic urethane diacrylate crosslinking agent of NAMW 2,200, diluted with 20% hexanediol diacrylate, from Sartomer. |
| CN2203 | is a polyester diacrylate crosslinking agent of NAMW 3,400 from Sartomer. |
| CN2609 | is a polyester diacrylate crosslinking agent of NAMW >800 from Sartomer. |
| CN704 | is a polyester diacrylate crosslinking agent of NAMW 5,000 from Sartomer. |
| CN186 | is an epoxy diacrylate crosslinking agent of NAMW 1,800 from Sartomer. |
| CN2003EU | is an epoxy diacrylate crosslinking agent of NAMW 3,000 from Sartomer. |
| CNUVE150/80 | is an epoxy diacrylate crosslinking agent of NAMW 4,000, diluted with 20% tripropylene glycol diacrylate, from Sartomer. |
| CN964A85 | is an aliphatic polyester based urethane diacrylate oligomer of NAMW 3,700 diluted with 15% tripropylene glycol diacrylate, from Sartomer. |
| SR-259 | is polyethylene glycol (200) diacrylate crosslinking agent of NAMW 302 from Sartomer. |
| MeHQ | is hydroquinone monomethyl ether, a polymerisation inhibitor from Merck |
| IPA | is 2-propanol from Shell (an inert solvent) |
| Darocur ™ 1173 | is a photoinitiator from BASF. |
| AeroSil ® 380 | is fumed silica particles of 7 nm average particle size and a specific surface area of 380 m$^2$/g from Evonik (a hydrophilic metal oxide thickening agent). |
| Sigma S5505 | is fumed silica particles of 0.2 μm average particle size and a specific surface area of 200 m$^2$/g from Sigma Aldrich (a hydrophilic metal oxide thickening agent). |
| Sigma S5130 | is fumed silica particles of 7 nm average particle size and a specific surface area of 395 m$^2$/g from Sigma Aldrich (a hydrophilic metal oxide thickening agent). |
| Shengke-206T | is precipitated calcium carbonate nano particles having an average particle size of 40-70 nm and a specific surface area (BET) of 24-30 m$^2$/g, obtained from ShengdaTech, Inc. |
| BYK ®-405 | is a solution of polyhydroxycarboxylic acid amides from BYK. |
| BYK ®-425 | is a 50 wt % solution of a polyurethane-based rheology control additive from BYK. |
| BYK ®-428 | is a 25 wt % solution of a polyurethane-based rheology control additive from BYK. |
| HEED | is N-(2-hydroxyethyl)ethylenediamine from Sigma-Aldrich |
| LiNO$_3$ | is lithium nitrate. |
| LiOH•H$_2$O | is lithium hydroxide monohydrate. |

The viscosity values provided in the tables were measured at 20° C. using a Physica MCR301 rheology meter from Anton Paar GmbH using the cone-plate in rotation mode and are expressed in Pa·s. "Visco at 0.1 s$^{-1}$" and "Visco at 1000 s$^{-1}$" mean the viscosity at a shear rate of 0.1 s$^{-1}$ and 1000 s$^{-1}$ respectively. The procedure for measuring the viscosity values at the various shear rates was as follows: Starting at a time we will call $T_0$, the composition under test was subjected to a shear rate of 0.1 s$^{-1}$ for 60 seconds, after which the shear rate was gradually increased to a value of 1000 s$^{-1}$ over a period of 150 seconds. The composition was kept at a shear rate of 1000 s$^{-1}$ for 15 seconds after which the viscosity value at 1000 s$^{-1}$ was determined and recorded as the "Visco at 1000 s$^{-1}$". Then the shear rate was decreased abruptly to a value of 0.1 s$^{-1}$ and kept at this shear rate for 60 seconds. The viscosity value at 0.1 s$^{-1}$ was determined 25 seconds after the abrupt decrease (i.e. at $T_0$+250 seconds).

The "visco ratio" is the ratio of the viscosity value at a shear rate of 0.1 s$^{-1}$ to the viscosity value at a shear rate of 1000 s$^{-1}$.

EXAMPLES 1 TO 36 AND COMPARATIVE EXAMPLES CE1 TO CE3

Stock compositions A, B, C, D and E were prepared by mixing the components shown in Table 1 below:

TABLE 1

Stock Compositions

| Component | Component type | Stock Composition A Amount (parts) | Stock Composition B Amount (parts) |
|---|---|---|---|
| AMPS | a) | 49.1 | 0 |
| DMAPAA-Q | a) | 0 | 53.2 |
| MBA | b) | 11.6 | 9.9 |
| Water | c) | 20 | 7 |
| IPA | c) | 8 | 8.4 |
| Darocur ™ 1173 | d) | 0.5 | 0.5 |
| LiOH•H$_2$O | g) | 9.8 | 0 |
| LiNO$_3$ | g) | 0 | 20 |
| MEHQ | stabiliser | 0.05 | 0.05 |
| Surfactant | surfactant | 1 | 1 |

TABLE 1-continued

Stock Compositions

| Component | Component type | Stock Composition C Amount (parts) | Stock Composition D Amount (parts) | Stock Composition E Amount (parts) |
|---|---|---|---|---|
| AMPS | a) | 28.7 | 0 | 0 |
| DMAPAA-Q | a) | 0 | 18.4 | 53.2 |
| BAHP | b) | 43.3 | 43.6 | 0 |
| MBA | b) | 0 | 0 | 9.9 |
| SR-259 | b) | 0 | 0 | 13.4 |
| Water | c) | 11.2 | 33.0 | 0 |
| IPA | c) | 9.5 | 0 | 0 |
| Darocur™ 1173 | d) | 0.5 | 0.5 | 0.5 |
| LiOH•H$_2$O | g) | 5.7 | 0 | 0 |
| LiNO$_3$ | g) | 0 | 3.6 | 20 |
| MEHQ | stabiliser | 0.05 | 0.05 | 0.05 |
| Surfactant | surfactant | 1 | 1 | 1 |

Radiation-curable compositions according to the invention were then prepared from the above stock compositions A to E by mixing the ingredients indicated in Tables 2 to 6 below in a Planetary Centrifugal Vacuum Mixer from Thinky, USA, at 40° C. and 2,000 rpm. The mixing was performed for 30 seconds in the presence of air and then for a further 90 seconds under vacuum to remove any dissolved gases. The radiation-curable compositions described in the Tables below were screen-printed in a patternwise manner using a Flat Screen Printing Machine AT-P760 from Alraun Technik, Germany, onto ion exchange membranes from Fujifilm. The radiation-curable compositions derived from Stock Compositions A and C were printed onto anion exchange membranes and the radiation-curable compositions derived from Stock Compositions B, D and E were printed onto cation exchange membranes.

The printed compositions were cured on the membranes using a Light Hammer LH10 from Fusion UV Systems fitted with a D-bulb working at 100% intensity with a speed of 30 m/min (single pass) to give membranes having textured surface profiles. The surface profiles had a rectangular form of about 1 mm length, 1 mm width and a height of 120 μm. The distance between the protrusions was about 2 mm.

The wet adhesion of the cured, screen printed compositions to the underlying membranes was measured by equilibrating the printed, textured membranes in water for 2 hours and the scratching the textured surface profile with a finger nail. When the protrusions present in the textured surface profile could not be removed by scratching, the wet adhesion was scored 'good'; when they could be removed easily the wet adhesion it was scored 'bad'; and when the protrusions could be removed only with difficulty the wet adhesion was scored 'acceptable'. The results are shown in the final row of each table below.

Comparative Examples CE1, CE2 and CE3 in Table 4 lacked component e) (the thickening agent).

Comparative Example CE3 did not thicken significantly

TABLE 2

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Stock Composition A | 89.7 | 89.7 | 89.7 | 89.7 | 89.7 | 89.7 | 89.7 | 89.7 | 89.7 |
| Aerosil® 380 | 4 | 4 | 4 | 4 | 4 | 4 | 4 | 4 | 4 |
| BYK®-425 | 0.3 | 0.3 | 0.3 | 0.3 | 0.3 | 0.3 | 0.3 | 0.3 | 0.3 |
| CN965 | 6 | — | — | — | — | — | — | — | — |
| CN910A70 | — | 6 | — | — | — | — | — | — | — |
| CN998B80 | — | — | 6 | — | — | — | — | — | — |
| CN2203 | — | — | — | 6 | — | — | — | — | — |
| CN2609 | — | — | — | — | 6 | — | — | — | — |
| CN704 | — | — | — | — | — | 6 | — | — | — |
| CN186 | — | — | — | — | — | — | 6 | — | — |
| CN2003EU | — | — | — | — | — | — | — | 6 | — |
| CNUVE150/80 | — | — | — | — | — | — | — | — | 6 |
| Wet adhesion | good | good | good | good | good | good | good | good | good |
| Visco at 0.1 s$^{-1}$ | 225 | 263 | 350 | 291 | 310 | 204 | 160 | 266 | 240 |
| Visco at 1000 s$^{-1}$ | 1.4 | 1.2 | 1.6 | 1.3 | 1.5 | 1.2 | 1.2 | 1.3 | 1.3 |
| Visco ratio | 159 | 219 | 219 | 224 | 207 | 170 | 133 | 205 | 185 |

TABLE 3

| | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Stock Composition B | 89.7 | 89.7 | 89.7 | 89.7 | 89.7 | 89.7 | 89.7 | 89.7 | 89.7 |
| BYK®-425 | 0.3 | 0.3 | 0.3 | 0.3 | 0.3 | 0.3 | 0.3 | 0.3 | 0.3 |
| Aerosil® 380 | 4 | 4 | 4 | 4 | 4 | 4 | 4 | 4 | 4 |
| CN965 | 6 | — | — | — | — | — | — | — | — |
| CN910A70 | — | 6 | — | — | — | — | — | — | — |
| CN998B80 | — | — | 6 | — | — | — | — | — | — |
| CN2203 | — | — | — | 6 | — | — | — | — | — |
| CN2609 | — | — | — | — | 6 | — | — | — | — |
| CN704 | — | — | — | — | — | 6 | — | — | — |
| CN186 | — | — | — | — | — | — | 6 | — | — |
| CN2003EU | — | — | — | — | — | — | — | 6 | — |

TABLE 3-continued

|  | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| CNUVE150/80 | — | — | — | — | — | — | — | — | 6 |
| Wet adhesion | good | good | good | good | good | good | good | good | good |
| Visco at 0.1 s$^{-1}$ | 80 | 78 | 75 | 74 | 60 | 78 | 62 | 89 | 74 |
| Visco at 1000 s$^{-1}$ | 1.0 | 0.9 | 0.7 | 0.9 | 0.9 | 1.2 | 1.2 | 1.0 | 1.1 |
| Visco ratio | 80 | 87 | 107 | 82 | 67 | 65 | 52 | 89 | 67 |

TABLE 4

|  | Ex. 19 | Ex. 20 | Ex. 21 | Ex. 22 | Ex. 23 | Ex. 24 | Ex. 25 | CE1 | CE2 |
|---|---|---|---|---|---|---|---|---|---|
| Stock Composition A | 93.7 | 90.7 | 90.7 | 87.7 | 96.7 | 90.7 | 90.7 | 97 | 94 |
| BYK ®-425 | 0.3 | 0.3 | 0.3 | 0.3 | 0.3 | 0.3 | 0.3 | 0 | 0 |
| AeroSil ® 380 | 3 | 6 | 3 | 6 | 3 | 0 | 0 | 0 | 0 |
| Sigma S5505 | 0 | 0 | 0 | 0 | 0 | 3 | 0 | 0 | 0 |
| Sigma S5130 | 0 | 0 | 0 | 0 | 0 | 0 | 3 | 0 | 0 |
| CN964A85 | 3 | 3 | 6 | 6 | 0 | 6 | 6 | 3 | 6 |
| Wet adhesion | good | good | good | good | acceptable | good | good | bad | bad |
| Visco at 0.1 s$^{-1}$ | 266 | 552 | 240 | 495 | 310 | 147 | 265 | 1.2 | 1.6 |
| Visco at 1000 s$^{-1}$ | 1.1 | 1.6 | 1.2 | 1.6 | 1.6 | 1.0 | 1.3 | 1.1 | 1.2 |
| Visco ratio | 242 | 345 | 200 | 309 | 194 | 147 | 204 | 1 | 1 |

TABLE 5

|  | Ex. 26 | Ex. 27 | Ex. 28 | Ex. 29 | Ex. 30 | Ex. 31 | Ex. 32 | Ex. 33 | CE3 |
|---|---|---|---|---|---|---|---|---|---|
| Stock Composition A | 88 | 85 | 87.5 | 0 | 0 | 0 | 0 | 0 | 0 |
| Stock Composition B | 0 | 0 | 0 | 87 | 0 | 0 | 0 | 89.2 | 88 |
| Stock Composition C | 0 | 0 | 0 | 0 | 89.7 | 0 | 0 | 0 | 0 |
| Stock Composition D | 0 | 0 | 0 | 0 | 0 | 89.7 | 0 | 0 | 0 |
| Stock Composition E | 0 | 0 | 0 | 0 | 0 | 0 | 89.7 | 0 | 0 |
| Shengke-206T | 0 | 0 | 0 | 0 | 0 | 0 | 0 | 0 | 6 |
| AeroSil ® 380 | 4 | 6 | 6 | 4 | 4 | 4 | 4 | 3.5 | 0 |
| BYK ®-405 | 2 | 3 | 0 | 0 | 0 | 0 | 0 | 0 | 0 |
| BYK ®-425 | 0 | 0 | 0.5 | 0 | 0.3 | 0.3 | 0.3 | 0.3 | 0 |
| BYK ®-428 | 0 | 0 | 0 | 0 | 0 | 0 | 0 | 1 | 0 |
| HEED | 0 | 0 | 0 | 3 | 0 | 0 | 0 | 0 | 0 |
| CN998B80 | 6 | 6 | 6 | 6 | 6 | 6 | 6 | 6 | 6 |
| Wet adhesion | good | good | good | good | good | good | good | good | n.a. |
| Visco at 0.1 s$^{-1}$ | 102 | 324 | 225 | 900 | 245 | 84 | 110 | 78 | <1 |
| Visco at 1000 s$^{-1}$ | 0.9 | 1.3 | 1.2 | 1.5 | 1.3 | 0.8 | 1.0 | 0.7 | <1 |
| Visco ratio | 113 | 249 | 188 | 600 | 188 | 105 | 110 | 111 | 1. |

TABLE 6

|  | Ex. 34 | Ex. 35 | Ex. 36 |
|---|---|---|---|
| Stock Composition A | 89.94 |  |  |
| Stock Composition B |  | 88.7 | 88.5 |
| AeroSil ® 380 | 4 | 5 | 5 |
| BYK ®-425 | 0.06 | 0.3 | 0.5 |
| CN998B80 | 6 | 6 | 6 |
| Wet adhesion | good | good | good |
| Visco at 0.1 s$^{-1}$ | 138 | 160 | 46 |
| Visco at 1000 s$^{-1}$ | 1.3 | 1.1 | 0.9 |
| Visco ratio | 106 | 145 | 51 |

The invention claimed is:

1. A process for preparing an ion-exchange membrane having a textured surface profile comprising the steps (i) and (ii):
   (i) applying a radiation-curable composition to a membrane in a patternwise manner; and
   (ii) irradiating and thereby curing the radiation-curable composition present on the membrane;
   wherein the radiation-curable composition comprises:
   a) 10 to 65 wt % of curable ionic compound(s) comprising one ethylenically unsaturated group;
   b) 3 to 60 wt % of crosslinking agent(s) comprising at least two ethylenically unsaturated groups and having a number average molecular weight below 800;
   c) 0 to 70 wt % of inert solvent(s);
   d) 0 to 10 wt % of free-radical initiator(s); and
   e) 0.5 to 25 wt % of thickening agent(s) comprising an inorganic filler in a form which has a BET surface area greater than 50 m$^2$/g.

2. The process according to claim 1 wherein during curing some or all components of the composition polymerise to form the desired surface profile.

3. The process according to claim 1 wherein the radiation-curable composition used in step (i) has a viscosity of 30 to 1000 Pa·s at a shear rate of 0.1 s$^{-1}$ and a viscosity of <20 Pa·s at a shear rate of 1000 s$^{-1}$, when measured at 20° C.

4. The process according to claim 1 wherein the ratio of the viscosity when measured at a shear rate of 0.1 s$^{-1}$ at 20° C. to the viscosity when measured at a shear rate of 1000 s$^{-1}$ at 20° C. is between 1.5 and 5000.

5. The process according to claim 1 wherein the textured surface profile comprises protrusions which have an average height of 5 to 500 μm.

6. The process according to claim 1 wherein step i) comprises rotary screen-printing, flatbed screen-printing or rotary-stop-cylinder screen-printing of the radiation-curable composition onto the membrane in a patternwise manner.

7. The process according to claim 1 wherein the textured surface profile comprises protrusions which have an average length to average width ratio of 10:1 to 1:10.

8. The process according to claim 1 wherein the radiation-curable composition comprises:
   a) 12 to 60 wt % of curable ionic compound(s) comprising one acrylic group and one or more acidic or basic group selected from sulfo, carboxy, phosphato, quaternary amino and tertiary amino groups;
   b) 4 to 45 wt % of crosslinking agent(s) comprising at least two ethylenically unsaturated groups and having a number average molecular weight below 800;
   c) 5 to 50 wt % of inert solvent(s);
   d) 0.01 to 10 wt % of free-radical initiator(s);
   e) 1 to 15 wt % of thickening agent wherein the inorganic filler is selected from the group consisting of hydrophilic metal oxides, carbon black, clays and calcium carbonate; and
   f) 1 to 15 wt % of crosslinking agent(s) comprising at least two ethylenically unsaturated groups and having a number average molecular weight of 800 to 8,000 Daltons.

9. A process for preparing an ion-exchange membrane having a textured surface profile comprising the steps (i) and (ii):
   (i) applying a radiation-curable composition to a membrane in a patternwise manner; and
   (ii) irradiating and thereby curing the radiation-curable composition present on the membrane;
   wherein the radiation-curable composition comprises:
   a) 10 to 65 wt % of curable ionic compound(s) comprising one ethylenically unsaturated group;
   b) 3 to 60 wt % of crosslinking agent(s) comprising at least two ethylenically unsaturated groups and having a number average molecular weight below 800;
   c) 0 to 70 wt % of inert solvent(s);
   d) 0 to 10 wt % of free-radical initiator(s); and
   e) 0.5 to 25 wt % of thickening agent(s)
   which further comprises the preparation of the membrane used in step (i) by a process comprising the steps (A) and (B):
   (A) impregnating a porous support with a radiation-curable composition;
   (B) forming the membrane by irradiating and thereby curing the radiation-curable curable composition present in the porous support.

10. The process according to claim 9 wherein the radiation-curable composition used in step (i) has a higher viscosity than the radiation-curable composition used in step (A).

11. The process according to claim 1 wherein the thickening agent e) comprises a rheology modifier and/or a particulate solid.

12. The process of claim 11 wherein the particulate solid comprises an inorganic filler selected from the group consisting of crystalline and amorphous silica, carbon black, clay particles, aluminum silicate, metal oxides and metal carbonates wherein the particulate solid has a specific surface area greater than 50 m$^2$/g as may be determined by the Brunauer, Emmett and Teller (BET) method of adsorption of nitrogen gas.

13. The process according to claim 1 wherein:
   (a) the radiation-curable composition used in step (i) has a viscosity of 30 to 1000 Pa·s at a shear rate of 0.1 s$^{-1}$ and a viscosity of <20 Pa·s at a shear rate of 1000 s$^{-1}$, when measured at 20° C.;
   (b) the ratio of the viscosity when measured at a shear rate of 0.1 s$^{-1}$ at 20° C. to the viscosity when measured at a shear rate of 1000 s$^{-1}$ at 20° C. is between 1.5 and 5000;
   (c) the textured surface profile comprises protrusions which have an average height of 5 to 500 μm; and
   (d) the textured surface profile comprises protrusions which have an average length to average width ratio of 10:1 to 1:10.

14. The process of claim 1 wherein:
   (a) the radiation-curable composition used in step (i) has a viscosity of 30 to 1000 Pa·s at a shear rate of 0.1 s$^{-1}$ and a viscosity of <20 Pa·s at a shear rate of 1000 s$^{-1}$, when measured at 20° C.;
   (b) the ratio of the viscosity when measured at a shear rate of 0.1 s$^{-1}$ at 20° C. to the viscosity when measured at a shear rate of 1000 s$^{-1}$ at 20° C. is between 1.5 and 5000;
   (c) the textured surface profile comprises protrusions which have an average height of 5 to 500 μm; and
   (d) the textured surface profile comprises protrusions which have an average length to average width ratio of 10:1 to 1:10;
   wherein the radiation-curable composition comprises:
   a) 12 to 60 wt % of curable ionic compound(s) comprising one acrylic group and one or more acidic or basic group selected from sulfo, carboxy, phosphato, quaternary amino and tertiary amino groups;
   b) 4 to 45 wt % of crosslinking agent(s) comprising at least two ethylenically unsaturated groups and having a number average molecular weight below 800;
   c) 5 to 50 wt % of inert solvent(s);
   d) 0.01 to 10 wt % of free-radical initiator(s);
   e) 1 to 15 wt % of thickening agent wherein the inorganic filler is selected from the group consisting of hydrophilic metal oxides, carbon black, clays and calcium carbonate; and
   f) 1 to 15 wt % of crosslinking agent(s) comprising at least two ethylenically unsaturated groups and having a number average molecular weight of 800 to 8,000 Daltons.

* * * * *